(12) United States Patent
Li et al.

(10) Patent No.: US 9,087,133 B2
(45) Date of Patent: Jul. 21, 2015

(54) METHOD AND APPARATUS FOR MANAGING INTERNET CONTENT

(75) Inventors: Zhi Li, San Ramon, CA (US); Raghvendra Savoor, Walnut Creek, CA (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 774 days.

(21) Appl. No.: 11/533,683

(22) Filed: Sep. 20, 2006

(65) Prior Publication Data

US 2008/0071792 A1    Mar. 20, 2008

(51) Int. Cl.
*G06F 15/173* (2006.01)
*G06F 7/00* (2006.01)
*H04L 29/06* (2006.01)
*G06F 7/04* (2006.01)
*G06F 17/30* (2006.01)

(52) U.S. Cl.
CPC .................................. *G06F 17/3089* (2013.01)

(58) Field of Classification Search
USPC ................ 726/1–33; 709/223–226, 238–244; 707/501.1; 713/201; 345/530
See application file for complete search history.

(56) References Cited

U.S. PATENT DOCUMENTS

| | | | |
|---|---|---|---|
| 2003/0009495 A1* | 1/2003 | Adjaoute | 707/501.1 |
| 2003/0131259 A1* | 7/2003 | Barton et al. | 713/201 |
| 2008/0250484 A1* | 10/2008 | Chong et al. | 726/7 |
| 2009/0128573 A1* | 5/2009 | Lambe et al. | 345/530 |

* cited by examiner

*Primary Examiner* — Kiet G Tang
(74) *Attorney, Agent, or Firm* — Guntin & Gust, PLC; Andrew Gust

(57) ABSTRACT

A method and apparatus for managing Internet content is disclosed. An apparatus that incorporates teachings of the present disclosure may include, for example, an Internet content manager (ICM) having a computing element that monitors Internet content supplied to subscribers of an Internet Service Provider (ISP) by one or more Internet content providers according to a process established by the ISP to certify said Internet content of the one or more Internet content providers. Additional embodiments are disclosed.

21 Claims, 3 Drawing Sheets

200

METHOD AND APPARATUS FOR MANAGING INTERNET CONTENT

FIELD OF THE DISCLOSURE

The present disclosure relates generally to communication systems, and more specifically to a method and apparatus for managing Internet content.

BACKGROUND

The number of Internet content providers continues to grow rapidly. The freedom to access content on the Internet brings many benefits, but also many issues. This freedom has emboldened some content providers to pervasively push unsolicited content to end users by way of pop-up windows containing advertisements and at times sexually explicit content. In other circumstances some content providers have injected spyware applications which can cause havoc with computing systems as well as draw consumers to purchase unwanted applications to rid themselves of these hidden applications.

These activities have led to the creation of software and hardware companies that produce pop-up blockers, content screening applications, URL blockers, applications that detect and eliminate spyware, and so on. Although helpful, these solutions have had limited success.

A need therefore arises for a method and apparatus that manages Internet content.

DETAILED DESCRIPTION OF THE DRAWINGS

Embodiments in accordance with the present disclosure provide a method and apparatus for managing Internet content.

In a first embodiment of the present disclosure, a method applied by an Internet Service Provider (ISP) can have the step of the ISP certifying Internet content from each of one or more Internet content providers prior to making available said Internet content to a subscriber of the ISP.

In a second embodiment of the present disclosure, an Internet content manager (ICM) can have a computing element that monitors Internet content supplied to subscribers of an Internet Service Provider (ISP) by one or more Internet content providers according to a process established by the ISP to certify said Internet content of the one or more Internet content providers.

In a third embodiment of the present disclosure, a method applied by an Internet Content Provider (ICP) can have the step of submitting a request to an Internet Service Provider (ISP) to certify Internet content of said ICP according to a certification process established by the ISP.

In a fourth embodiment of the present disclosure, a computer-readable storage medium can have computer instructions for monitoring Internet content supplied to subscribers of an Internet Service Provider (ISP) by one or more Internet content providers according to a certification process established by the ISP.

Figure 1:
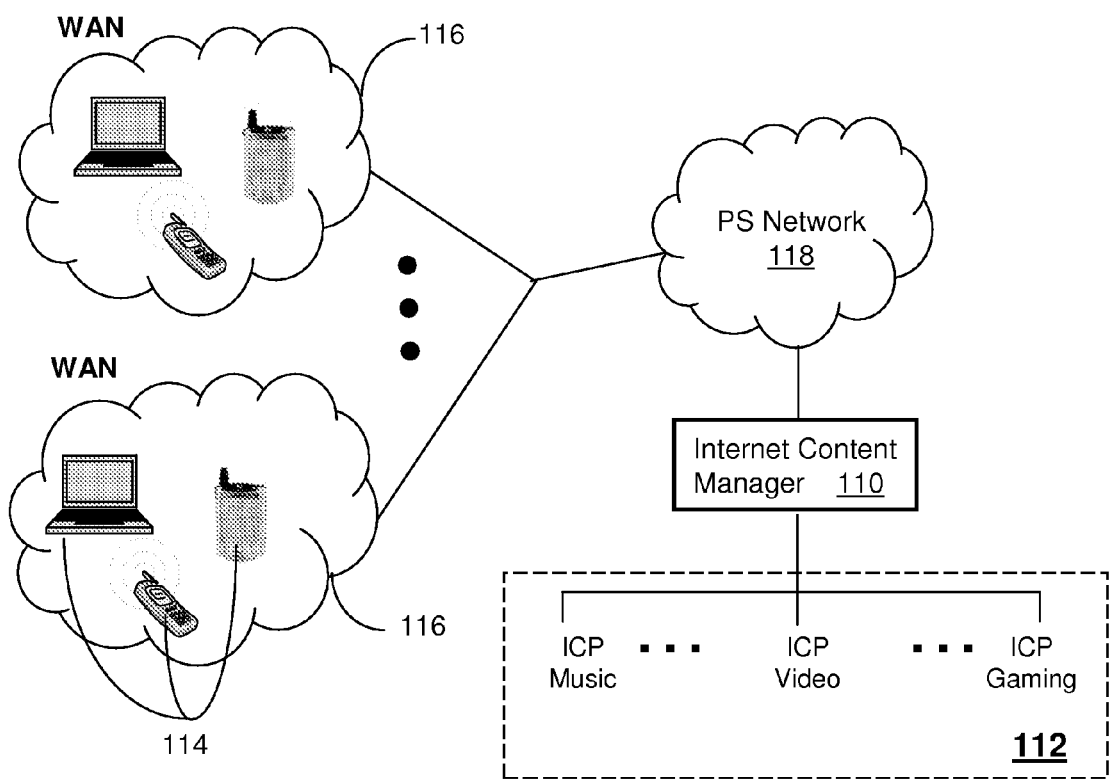
FIG. 1 depicts an exemplary embodiment of a communication system.

FIG. 1 depicts an exemplary embodiment of a communication system 100. The communication system 100 can comprise a number of Wireline or Wireless Access Networks (WANs) 116 which support any number of access technologies such as Public Switched Telephone Network (PSTN), xDSL, cable, WiFi, WiMAX, cellular (e.g., GSM, CDMA, UMTS, etc.), Bluetooth, software defined radio (SDR), ultra wide band (UWB), and so on. In one of several embodiments, WANs 116 can represent, for example, WiFi hotspots established by retailers to draw patrons to their establishment for additional business. Alternatively, a WAN 116 can be established in a residence, or in a commercial enterprise with a number of users utilizing a terminal device 114 such as a computer to access Internet content, submit and receive emails, and so on.

The terminal devices 114 in FIG. 1 can represent single-mode or multimode roaming communication devices capable of interfacing to the WANs 116 by wire or wirelessly. The terminal devices 114 can comprise a number of embodiments including without limitation computing devices (e.g., a laptop, desktop computer, or server), a cellular phone with single-mode or multimode capability (e.g., WiFi and cellular), and a personal digital assistant (PDA) with wireless capability. In the case of a wireless terminal device 114, an end user of said device can be afforded the flexibility of roaming between WANs 116 of the communication system 100.

The WANs 116 can be coupled to a packet-switched (PS) network 118. The PS network 118 and the WANs 116 can be supported by, for example, a Tier 1 Internet Service Provider (ISP) utilizing common packet-switched routing technologies (e.g., an IP, Frame Relay, Asynchronous Transfer Mode or ATM, Multi-protocol Label Switching or MPLS) for transporting packet traffic between end users that have subscribed to services of the communication system 100. Internet Content Providers (ICPs) 112 can be coupled to the PS network 118 by way of an Internet Content Manager (ICM) 110. The ICM 110 can be used for managing Internet content supplied by the ICPs 112 to subscribers of the communication system 100. The Internet content supplied by the ICPs 112 can conform to any existing or future Internet protocol (e.g., XML, VXML, Session Initiation Protocol or SIP, IP Multimedia Subsystem or IMS) for the purposes of delivering content to subscribers by way of an Internet application such as an Internet browser.

The Internet content can comprise software applications, services (e.g., HTTP services, Voice over IP or VoIP services, IP Multimedia Subsystem or IMS services, etc.), multimedia content with visual and/or audio content, flash media, pop-up windows, advertisements, spyware, cookies, or any other form of content that can be delivered or retrieved from a terminal device 114 of a subscriber. The ICPs 112 can be independently operated or can be aggregated by an Internet content broker by way of a common portal. The ICPs 112 can represent Internet content publishers, advertisement brokers, or brokers of Internet tracking applications (e.g., spyware)—just to name a few.

Figure 2:
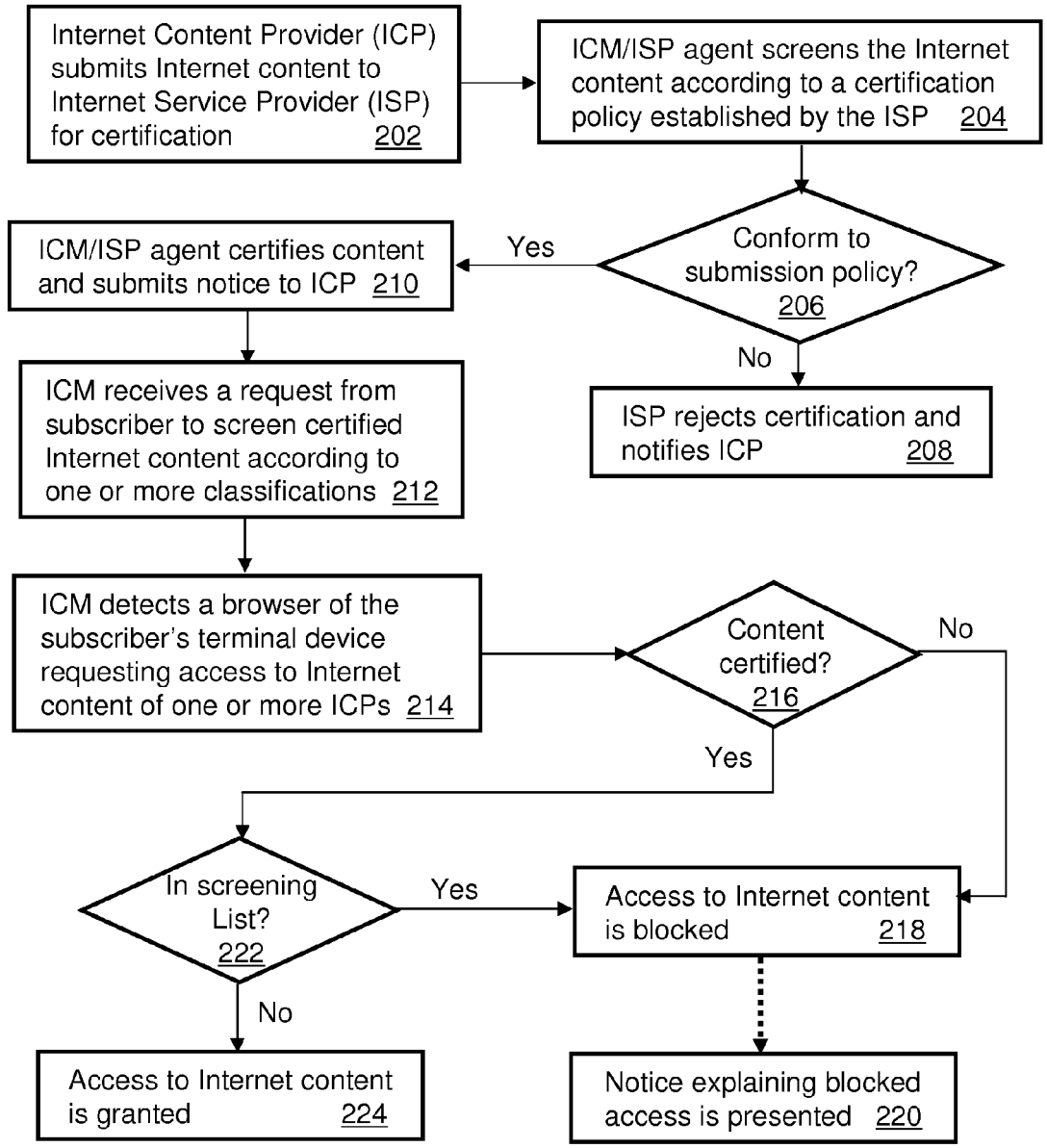
FIG. 2 depicts an exemplary method operating in portions of the communication system.

FIG. 2 depicts an exemplary method 200 operating in portions of the communication system 100. Method 200 as will be described shortly can be implemented in whole or in part by ICM 110 and one or more agents of the ISP managing communication system 100. With this in mind, method 200 begins with step 202 in which one of the ICPs 112 submits for certification Internet content to the ISP. The ISP screens the Internet content and can certify said content according to a certification policy established by the ISP. A certification policy can comprise a group of classifications that can include, for example, an age group classification, a nature of content classification, a content type classification, and an audience maturity classification. The foregoing classifications can be applied with any criteria defined by the ISP.

For example, the ISP can define an age group classification based on the appropriateness of presenting the Internet content to various audience types much like the Movie Picture Association of America (MPAA) film rating system (e.g., movies rated as G, PG, PG-13, R, and NC-17). The ISP can establish criteria screening the content for any number of age group classifications. For example, the ISP can determine that Internet content is appropriate for general audiences if it avoids use of profanity, violence of any kind, and explicit or implicit sexual material or innuendos. Other criteria can be used for other age group classifications.

Similarly, the ISP can establish criteria for a nature of content classification. For example, the ISP can define a variety of nature of content classifications such as mild violence, violence, extreme violence, sexually explicit or implicit content or innuendos, adult language, profanity, language and images inappropriate for children under the age of 7, etc. The ISP can thus define any number of nature of content classifications considered suitable for screening the Internet content. The ISP can also define a number of content type classifications such as educational, entertainment, gaming, gambling, pornographic, etc. The ISP can also define a number of audience maturity classifications which are less specific than age group classifications such as, for example, mature audiences only, not intended for young children, suitable for young children, and so on.

The ISP can thus screen the Internet content supplied in step 202 according to criteria established for one or more of the above classifications (or other classifications conceived of by the ISP not disclosed herein). The certification process can be mechanized by executing one or more content screening applications by way of a computing element of the ICM 110. The computing element can represent a desktop computer, or server that can execute any number of applications or steps depicted by method 200. The content screening applications can search and identify characteristics of the Internet content for purposes classifying said content.

Content screening applications can be implemented with common software and/or hardware techniques and can operate as an integral part of the ICM 110. Accordingly, the ICM 110 can be programmed to perform image and data processing on the Internet content supplied by the ICP 112. For instance, the content screening applications may be able to process the Internet content using common image processing techniques and detect therefrom visual images of violence or explicit sexual behavior (e.g., detect weaponry, nudity, sexual intercourse, or violence between individuals or animation objects or characters). The ICM 110 can also be programmed to screen audible or textual language (e.g., language appropriate for any audience, language requiring parental guidance—mild profanity or innuendos, language for adults only—excessive profanity, etc.). The content screening applications can also be programmed with the ISPs criteria for classifications. Accordingly, the ICM 110 can screen and generate recommendations to the ISP for classifying the Internet content. In more sophisticated applications, the ICM 110 can also perform the classification exclusively.

Alternatively, the screening process can be combined or replaced with screening performed by an agent of the ISP. The agent can, for example, review the Internet content without automation, or view the results delivered by the ICM 110 as well as apply his or her own judgment for classifying the Internet content based on the criteria established by the ISP. The agent and/or ICM 110 can also determine in step 206 that the Internet content supplied by the ICP 112 does not conform to a submission policy defined by the ISP. For example, the ICP 112 may have not complied with the submission requirements that the ISP determines are necessary to adequately screen the Internet content. For example, part of the submission policy may require documentation to explain the nature of the content, how it will be invoked while a subscriber is navigating through a website of the ICP 112, and so on.

If the Internet content satisfies the submission policy, an agent of the ISP, or the ICM 110 certifies in step 210 the Internet content according to one or more of the classifications set forth above and notifies the ICP 112 of the results. The ICP 112 can then make the certified Internet content available at a website or portal if not already available.

To enhance the experience of its subscribers, the ICM 110 can be programmed in step 212 to receive a request to screen certified Internet content according to one or more classifications selected by a subscriber of the communication system 100. For instance, the subscriber can request that the ISP by way of the ICM 110 monitor and restrict access to any certified Internet content that has explicit sexual content. The ICM 110 can thus prevent a common Internet browser of the subscriber or any parties associated therewith (e.g., members of the same household, or employees of an enterprise) from accessing certified Internet content that has been classified as containing explicit sexual content. The subscriber can submit this request in a number of ways. For example, the subscriber can log into a website of the ISP by way of the ICM 110 and select check boxes with classifications for screening certified Internet content. The website can, for example, provide a brief description of each classification and the impact of selecting a classification for screening purposes.

With a screening list selected by a subscriber, the ICM 110 can proceed to step 214 where it detects a request for access by one of the subscriber's terminal devices 114 to Internet content of one or more of the ICPs 112. The ICM 110 checks in step 216 if said content is certified by the ISP according to the process previously described. If it is not certified, the ICM proceeds to step 218 where it blocks access to the Internet content by common means such as, for example, not resolving a Domain Name Service (DNS) request, or presenting a web page notice to the subscriber's browser in step 220 indicating the site is blocked due to lack of certification of said content.

If, on the other hand, the Internet content requested is certified, the ICM 110 proceeds to step 222 and checks if the classification of the certified Internet content requested is in the subscriber's screening list. If it is, then the ICM 110 proceeds to steps 218 where it blocks access, and notifies the subscriber by way of the browser in step 220 that the content has been blocked in compliance with the screening list. Otherwise, the ICM 110 proceeds to step 224 where it grants the subscriber's browser access to said content.

The aforementioned steps of method 200 are repeated as often as needed to certify new Internet content from the ICPs 112, and for managing the Internet content presented to the subscribers of the ISP as discussed above. Method 200 as disclosed provides subscribers of the IPS an alternative means to purchasing complex and expensive screening software for his or her terminal devices 114. It benefits the ISP in competing and differentiating itself from other ISPs that do not supply such certification and screening services to its subscribers.

Upon reviewing the present disclosure, it would be evident to an artisan with ordinary skill in the art that the aforementioned embodiments can be modified, reduced, or enhanced without departing from the scope and spirit of the claims described below. Accordingly, the reader is directed to the claims below for a fuller understanding of the breadth and scope of the present disclosure.

Figure 3:
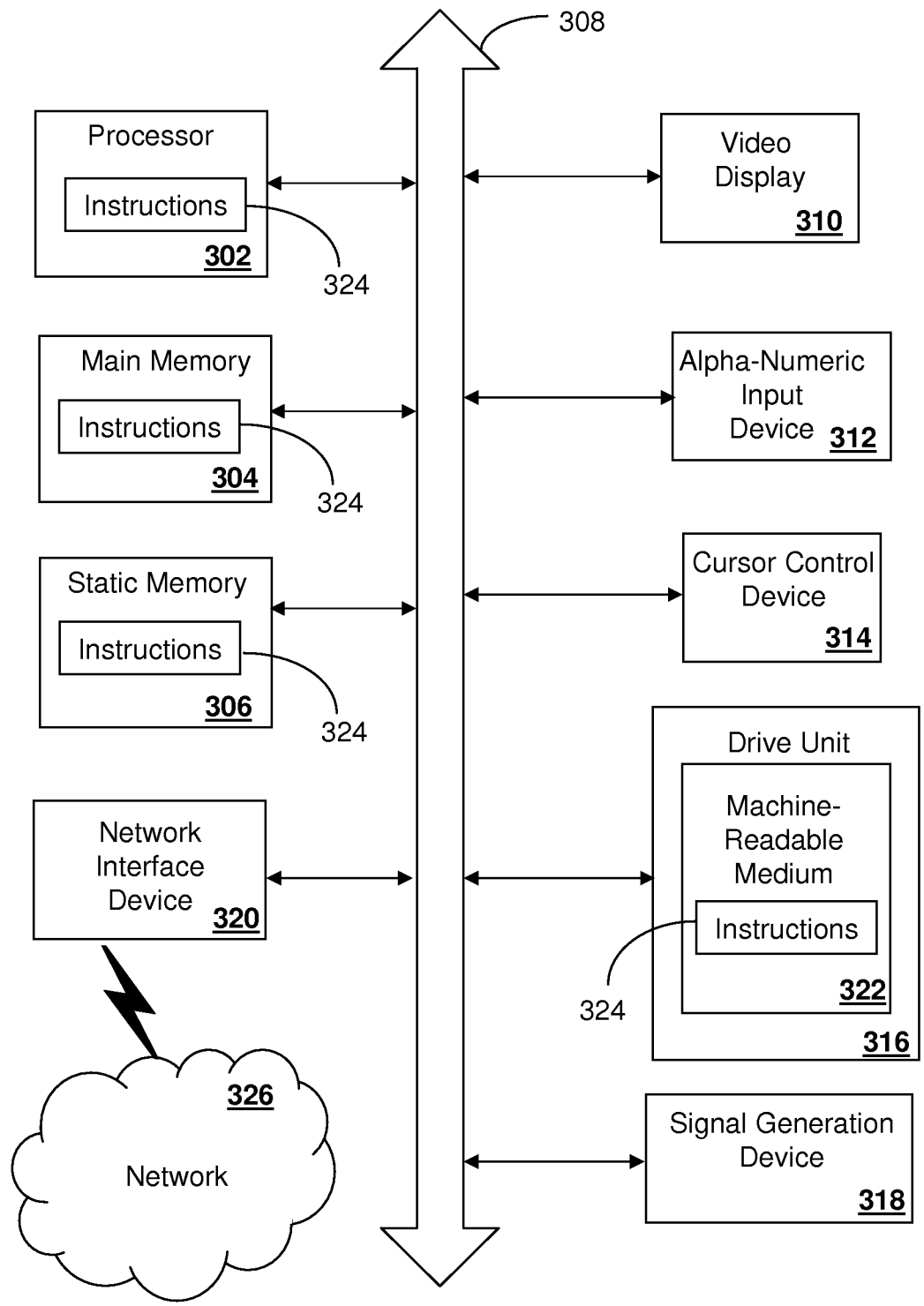
FIG. 3 depicts an exemplary diagrammatic representation of a machine in the form of a computer system within which a set of instructions, when executed, may cause the machine to perform any one or more of the methodologies disclosed herein.

FIG. 3 depicts an exemplary diagrammatic representation of a machine in the form of a computer system 300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 300 may include a processor 302 (e.g., a central processing unit (CPU), a graphics processing unit (GPU, or both), a main memory 304 and a static memory 306, which communicate with each other via a bus 308. The computer system 300 may further include a video display unit 310 (e.g., a liquid crystal display (LCD), a flat panel, a solid state display, or a cathode ray tube (CRT)). The computer system 300 may include an input device 312 (e.g., a keyboard), a cursor control device 314 (e.g., a mouse), a disk drive unit 316, a signal generation device 318 (e.g., a speaker or remote control) and a network interface device 320.

The disk drive unit 316 may include a machine-readable medium 322 on which is stored one or more sets of instructions (e.g., software 324) embodying any one or more of the methodologies or functions described herein, including those methods illustrated above. The instructions 324 may also reside, completely or at least partially, within the main memory 304, the static memory 306, and/or within the processor 302 during execution thereof by the computer system 300. The main memory 304 and the processor 302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 324, or that which receives and executes instructions 324 from a propagated signal so that a device connected to a network environment 326 can send or receive voice, video or data, and to communicate over the network 326 using the instructions 324. The instructions 324 may further be transmitted or received over a network 326 via the network interface device 320.

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, by a server of an Internet service provider, content from content providers;
   analyzing, by the server, the content by performing image recognition on images of the content to apply classifications to each of the content according to a certification policy, wherein the content is certified to generate certified content after completion of the analyzing;
   receiving, by the server, a request for access to target content from an end user device;
   responsive to a determination that the target content is not included in the certified content, blocking, by the server, the access to the target content by the end user device; and
   responsive to a determination that the target content is included in the certified content and is included on a screening list, blocking, by the server, the access to the target content by the end user device, wherein the screening list is based on the classifications.

2. The method of claim 1, wherein the content providers comprise an advertisement broker, an Internet content publisher, a broker of Internet content, a broker of Internet tracking applications, or combinations thereof, and wherein the server blocks access by not resolving a domain name service request.

3. The method of claim 1, wherein the performing of the image recognition on the images of the content to generate the classifications comprises detecting objects in the images corresponding to weapons, and wherein the classifications comprise violence between individuals.

4. The method of claim 3, wherein the classifications are generated by the server based on criteria established by the Internet service provider.

5. The method of claim 3, wherein the classifications comprise an age group classification, a nature of content classification, a content type classification, and an audience maturity classification.

6. The method of claim 5, wherein the content is certified based in part on information provided by the content provider that describes the content.

7. The method of claim 1, wherein the blocking of access to the target content comprises providing notification to the end user device that the corresponding content provider has not submitted the target content to the Internet service provider for a pre-certification analysis.

8. The method of claim 1, wherein the blocking of access to the target content comprises providing a web page notice from the server.

9. An Internet content manager, comprising: a computing server that monitors Internet content supplied to subscribers of an Internet service provider by content providers according to a pre-certification established by the Internet service provider to certify the Internet content of the content providers, wherein the certifying of the Internet content is performed by analyzing the Internet content prior to detecting a request for the Internet content from a subscriber, wherein the analyzing of the Internet content comprises performing image recognition to determine if an image of the Internet content satisfies a certification policy, and wherein the computing server selectively blocks access to select Internet content in response to the subscriber request according to the certifying of the Internet content and selectively blocks access to all Internet content that has not received the pre-certification prior to the request from the subscriber for access.

10. The Internet content manager of claim 9, wherein the content providers comprise at least one among an advertisement broker, an Internet content publisher, a broker of Internet content, and a broker of Internet tracking applications.

11. The Internet content manager of claim 9, wherein the computing server receives a request from one among the content providers to certify Internet content supplied with the request and submits to the content provider making the request a certification for the Internet content according to at least one among a group of classifications.

12. The Internet content manager of claim 11, wherein the computing server receives the certification from the Internet service provider which screens the Internet content by way of at least one among a content screening application and an agent of the Internet service provider.

13. The Internet content manager of claim 11, wherein the group of classifications comprises at least one among an age group classification, a nature of content classification, a content type classification, and an audience maturity classification.

14. The Internet content manager of claim 11, wherein the computing server receives from a terminal device of the subscriber a request to screen the certified Internet content of the content providers according to classifications selected from the group of classifications, and prevents access to the certified Internet content of the content providers by a browser of the terminal device when classifications associated with the certified Internet content match the selected classifications.

15. The Internet content manager of claim 9, wherein the computing server selectively blocks access to select Internet content by providing a notification that Internet content has not been pre-certified.

16. The Internet content manager of claim 15, wherein the computing server selectively blocks access to select Internet content by not resolving a Domain Name Service request submitted by the browser.

17. A method, comprising:
using an Internet content provider server, submitting a request to an Internet service provider for pre-certifying Internet content of the Internet content provider according to a certification process established by the Internet service provider, wherein the pre-certifying of the Internet content is performed by scanning of the Internet content using a proxy server prior to a request for the Internet content from a subscriber, wherein the scanning of the Internet content comprises the proxy server performing image recognition to determine if an image of the Internet content satisfies a certification policy, and wherein the Internet service provider selectively blocks access to select Internet content in response to the subscriber request according to the certifying of the Internet content and according to a failure by the Internet content provider to obtain the pre-certifying.

18. The method of claim 17, wherein the Internet service provider selectively blocks access to the select Internet content by providing a notification that the select Internet content has not been pre-certified.

19. The method of claim 17, wherein the Internet content provider comprises at least one among an advertisement broker, an Internet content publisher, a broker of Internet content, and a broker of Internet tracking applications.

20. The method of claim 17, wherein the Internet service provider certifies the Internet content according to at least one among a group of classifications comprising at least one among an age group classification, a nature of content classification, a content type classification, and an audience maturity classification.

21. A non-transitory computer-readable storage medium, comprising computer instructions which, when executed by a processor of a server managed by an Internet service provider, causes the processor to perform operations comprising:
receiving content from content providers;
analyzing the content by performing image recognition on images of the content to apply classifications to each of the content according to a certification policy, wherein the content is certified to generate certified content after completion of the analyzing;
receiving a request for access to target content from an end user device; responsive to a determination that the target content is not included in the certified content, blocking, by the server, the access to the target content by the end user device; and
responsive to a determination that the target content is included in the certified content and is included on a screening list, blocking, by the server, the access to the target content by the end user device, wherein the screening list is based on the classifications.

* * * * *